(12) United States Patent  
Lay

(10) Patent No.: US 6,170,581 B1
(45) Date of Patent: Jan. 9, 2001

(54) BACKHEAD AND CHECK VALVE FOR DOWN-HOLE DRILLS

(75) Inventor: Warren T. Lay, Catawba, VA (US)

(73) Assignee: Ingersoll-Rand Company, Woodcliff, NJ (US)

( * ) Notice: Under 35 U.S.C. 154(b), the term of this patent shall be extended for 0 days.

(21) Appl. No.: 09/330,707

(22) Filed: Jun. 11, 1999

Related U.S. Application Data

(60) Provisional application No. 60/089,151, filed on Jun. 12, 1998.

(51) Int. Cl.⁷ ........................................... E21B 4/14
(52) U.S. Cl. ................................. 175/296; 91/317
(58) Field of Search ..................... 91/317, 325, 318, 91/319; 166/319, 320, 321, 322; 175/296, 100, 293, 215; 173/78–80, 139

(56) References Cited

U.S. PATENT DOCUMENTS

| | | | |
|---|---|---|---|
| 5,085,284 | * 2/1992 | Fu | 175/296 |
| 5,301,761 | * 4/1994 | Fu et al. | 175/296 |
| 5,562,170 | * 10/1996 | Wolfer et al. | 175/296 |
| 5,566,771 | * 10/1996 | Wolfer et al. | 175/296 |
| 5,711,205 | * 1/1998 | Wolfer et al. | 91/218 X |

* cited by examiner

Primary Examiner—Robert E. Pezzuto
(74) Attorney, Agent, or Firm—Mark A. Ussai

(57) ABSTRACT

A check valve system is for a fluid-actuated percussive drill assembly including a casing, a backhead connected with and extending into the casing, and a fluid distributor disposed within the casing. The backhead has a central axis, a supply passage extending along the axis, and an outer surface section extending circumferentially about the axis and disposed within the casing. The check valve system includes a port extending between the outer circumferential surface section of the backhead and the supply passage. Preferably, several ports are spaced circumferentially about the backhead outer surface. An annular check valve is disposed about the outer circumferential surface section of the backhead and is configured to alternately permit fluid flow through the backhead port and substantially seal the backhead port. At least a portion of the check valve is movable between a first position, where the check valve portion is disposed across and generally obstructs the backhead port, and a second position, where the check valve portion is spaced from the backhead port. The backhead body has an inner end disposed within the casing and a recess extending into the body from the end and generally along the central axis, the recess being sized to receive the a portion of the fluid distributor portion so as to generally retain the distributor at a desired position within the casing.

16 Claims, 3 Drawing Sheets

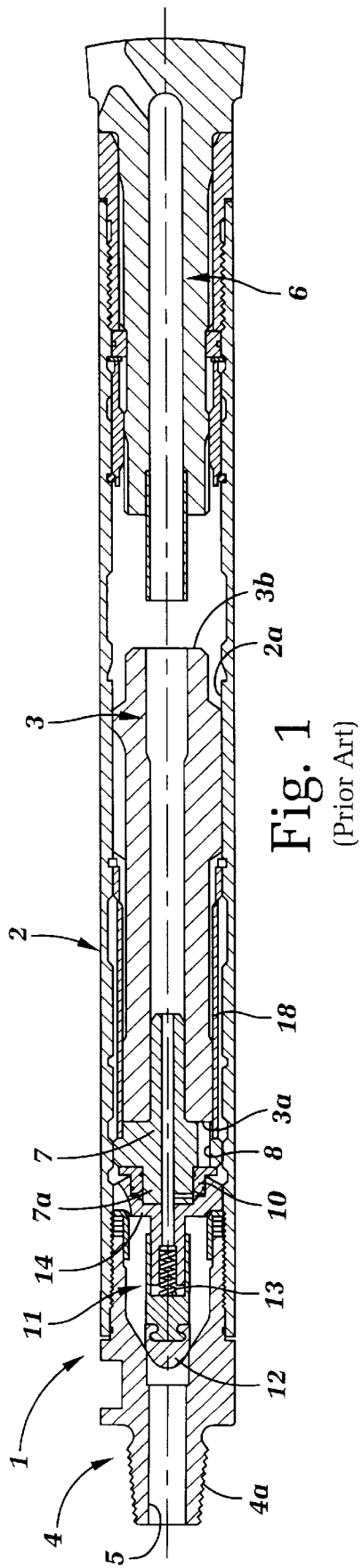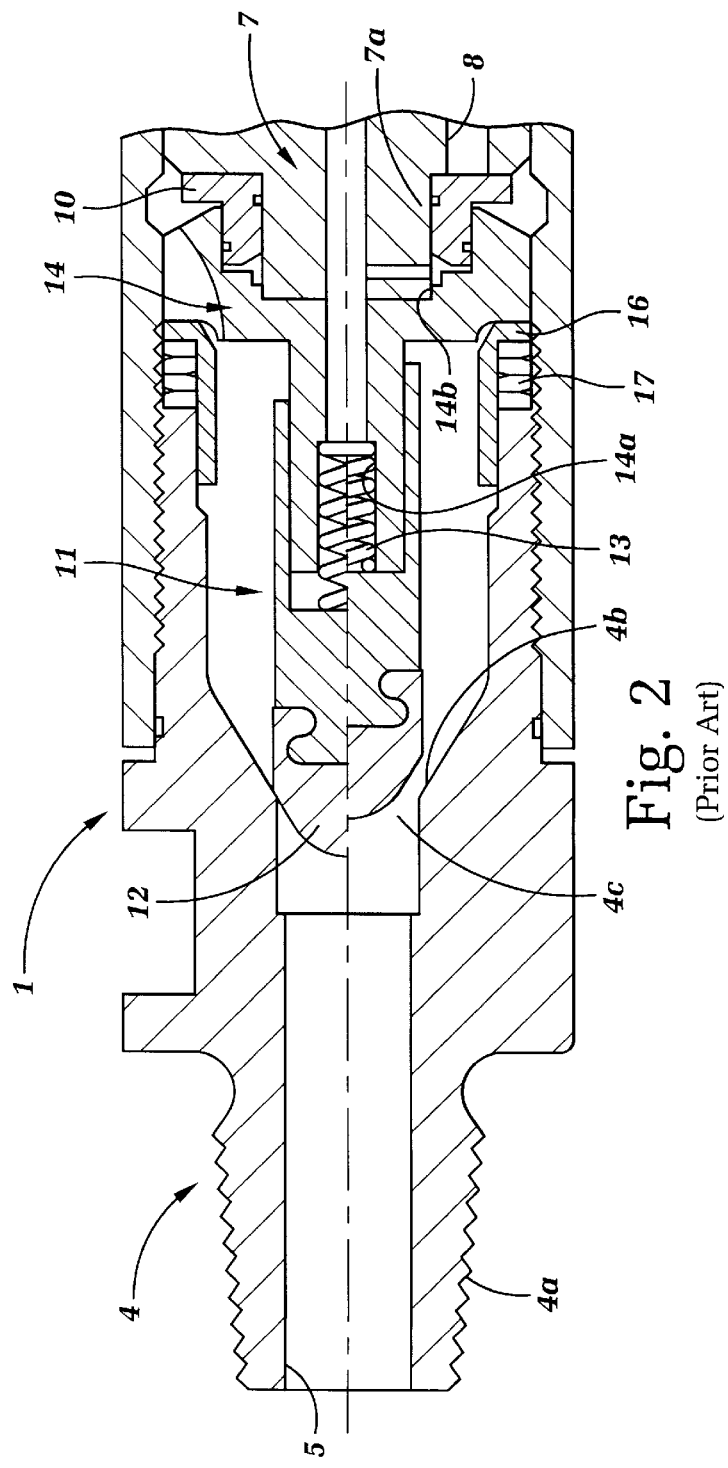
Fig. 1 (Prior Art)
Fig. 2 (Prior Art)

BACKHEAD AND CHECK VALVE FOR DOWN-HOLE DRILLS

This application claims the benefit of U.S. Provisional Application No. 60/089,151, filed Jun. 12, 1998.

BACKGROUND OF THE INVENTION

The present invention relates to drill assemblies, and particularly to backheads and check valves used in drill assemblies having fluid-actuated pistons.

Drill assemblies, particularly percussive down-hole drills having fluid-actuated pistons, are well known, such as those disclosed in U.S. Pat. No. 5,085,284 of Fu, U.S. Pat. No. 5,301,761 of Fu et al., U.S. Pat. No. 5,562,170 of Wolfer et al., U.S. Pat. No. 5,711,205 (Wolfer et al.) and U.S. Pat. No. 5,566,771 of Wolfer et al. Referring to FIGS. 1 and 2, a typical down-hole drill assembly 1 includes a casing 2 containing the internal components of the drill assembly 1, including a piston 3 and a backhead 4 that connects the drill assembly 1 to a drilling machine (not shown). The backhead 4 has a supply passage 5 for directing percussive fluid, generally high-pressure compressed air, into the drill assembly 1. The upper end 4a of the backhead 4 is connected with a source of percussive fluid, for example, a fluid supply line connected with a compressor (not shown), such that percussive fluid is supplied to the drill assembly 1 to operate the piston 3.

The piston 3 is slidably mounted within the casing 2 and is guided by an inner bearing surface 2a of the casing 2 so as to reciprocally impact with a drill bit 6, which provides the work output of the drill assembly 1. The piston 3 is actuated by the pressure of the percussive fluid, which is directed alternately to the upper and lower ends 3a, 3b, respectively, of the piston 3 so as to thereby cause reciprocating sliding movement of the piston 3. Typically, the drill assembly includes a fluid distributor 7 having at least one passage 8, preferably a plurality of passages 8, for directing percussive fluid to a drive chamber (not shown) defined within the casing 2 between the distributor 7 and the upper end 3a of the piston 3. The flow of percussive fluid through the distributor passages 8 is preferably regulated by a distributor valve 10 disposed about and slidable along a cylindrical end portion 7a of the distributor 7. However, such a distributor valve 10, while enabling ideal operation of the drill assembly 1, is not required for the drill assembly 1 to function in an appropriate manner.

In order to prevent contaminants, such a water or rock debris, from entering or "backflowing" into the casing 2 and potentially causing damage to and/or interfering with the proper functioning of the components of the drill assembly 1, the pressure of the percussive fluid in the casing 2 should always remain above ambient pressure. However, when the supply of percussive fluid to the backhead 4 is turned off, percussive fluid within the casing 2 will flow out of the drill assembly 1 through the backhead supply passage 5, if the passage 5 is not sealed, allowing the backflow of contaminants into the drill assembly 1.

One known device to prevent backflow into the drill assembly 1 is to provide a check valve 11 disposed within the casing 2 between the fluid distributor 7 and the backhead 4, as best shown in FIG. 2. The check valve 11 includes a valve plug 12 that is movable toward and away from a valve seating surface 4b, which in FIGS. 1 and 2 is provided by a tapered wall portion inside the backhead 4 surrounding an axial opening 4c that forms a section of the supply passage 5. The plug 12 is biased toward the seating surface 4a by a valve spring 13 extending between the movable plug 12 and a stationary valve cap 14. The valve cap 14 includes a first recess 14a at an upper side which retains the lower end of the spring 13 and a second recess 14b on the lower side, which is sized to receive the end of the distributor portion 7a. Further, to maintain the distributor 7 at a desired position within the casing 2, a retainer member 16 is biased by a spring 17 to push against the valve cap 14, such that the distributor 7 is "sandwiched" between the valve cap 14 and the upper end of a sleeve 18 (FIG. 1).

Due to the fact that the above-described check valve 11 has several moving parts, at least some components of the valve 11 will eventually have to be replaced. The valve spring 13 will likely experience fatigue failure after a certain period of use. Further, the movable plug 12 may become worn due to repeated impact with the valve seating surface 4a, such that percussive fluid may flow or "seep" between the plug 12 and the seat 4b and cause the casing pressure to decrease to ambient pressure. Thus, the valve spring 13 and movable plug 12 may have to be replaced several times during the life of the drill assembly 1. Further, due to the potential that one or more check valve components will wear or break, there is still a significant risk that the backflowing of contaminants may occur.

In view of the above-discussed limitations with the known check valve 11, it would be desirable to have a check valve system that involved fewer moving parts. Further, it would be desirable to have a check valve that was simpler and thus less expensive to produce. Furthermore, it would also be desirable to have a device for maintaining the distributor 7 at a desired position that is simpler than the spring-biased retainer 16 and that preferably has no moving parts.

SUMMARY OF THE INVENTION

In one aspect, the present invention is a check valve system for a fluid-actuated percussive drill assembly. The drill assembly includes a casing and a backhead connected with and extending into the casing. The backhead has a longitudinal central axis, a supply passage extending along the central axis, and an outer surface section extending circumferentially about the central axis and disposed within the casing. The check valve system comprises a port extending between the outer circumferential surface section of the backhead and the supply passage. A check valve is disposed about the outer circumferential surface section of the backhead and is configured to alternately permit fluid flow through the backhead port and substantially seal the backhead port.

In another aspect, the present invention is a check valve for a fluid-actuated percussive drill assembly. The drill assembly includes a casing and a backhead connected with and extending into the casing. The backhead has a longitudinal central axis, a supply passage extending along the central axis, an outer surface extending circumferentially about the axis and disposed within the casing, and a port extending between the outer circumferential surface and the supply passage. The check valve comprises an annular member disposable about the outer circumferential surface of the backhead. The annular member is configured to alternately permit fluid flow through the backhead port and substantially seal the backhead port.

In yet another aspect, the present invention is a backhead for a fluid-actuated percussive drill assembly having a casing and a fluid distributor disposed within the casing. The backhead comprises a body connected with the casing and having an end disposed within the casing. The end of the body is configured to receive a portion of the distributor so as to generally retain the distributor at a desired position within the casing.

In an even further aspect, the present invention is also a backhead for a fluid-actuated percussive drill assembly. The backhead comprises a body having a first end, a second end, an inlet port at the first end, an outer circumferential surface section disposed between the first and second ends, a plurality of radial outlet ports spaced circumferentially about the outer surface section, and a supply passage extending between the inlet port and the outlet ports.

BRIEF DESCRIPTION OF THE SEVERAL VIEWS OF THE DRAWINGS

The foregoing summary, as well as the detailed description of the preferred embodiments of the invention, will be better understood when read in conjunction with the appended drawings. For the purpose of illustrating the invention, there is shown in the drawings, which are diagrammatic, embodiments that are presently preferred. It should be understood, however, that the invention is not limited to the precise arrangements and instrumentalities shown. In the drawings:

FIG. 1 is a axial cross-sectional view of a typical downhole drill assembly having a known backhead and check valve system;

FIG. 2 is a broken-away, enlarged axial cross-sectional view of the drill assembly of FIG. 1, showing the check valve in a closed position in the upper half of the figure and in an open position in the lower half of the figure;

DETAILED DESCRIPTION OF THE INVENTION

Figure 3:
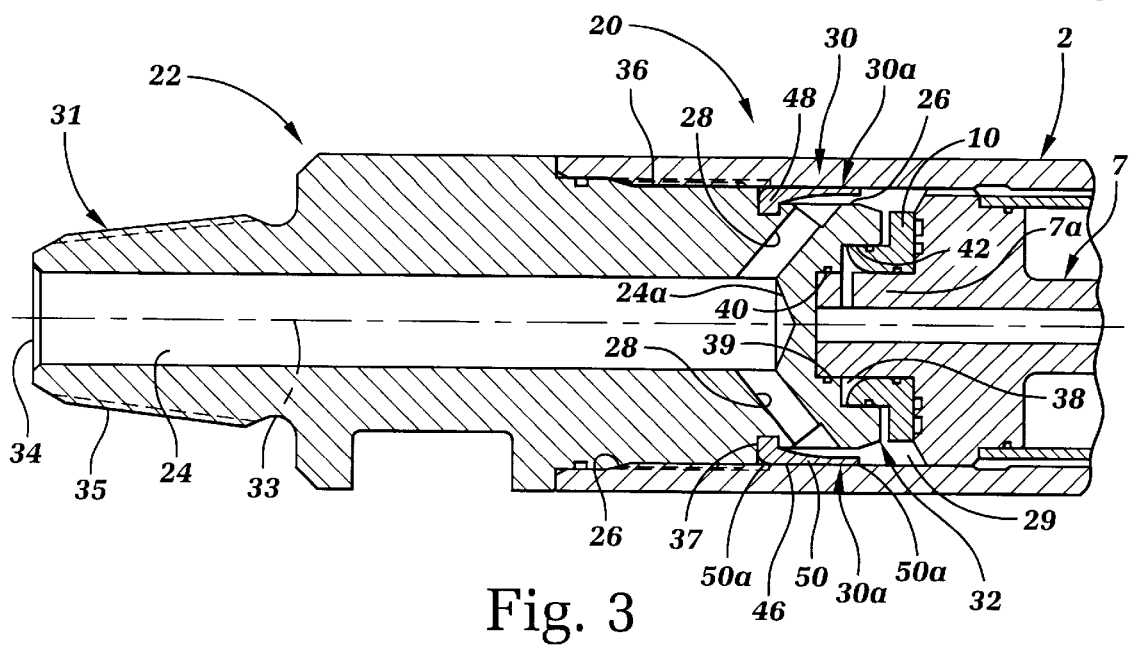
FIG. 3 is a broken-away, enlarged axial cross-sectional view of a drill assembly having a check valve system, backhead and check valve in accordance with the present invention, showing the improved check valve in a closed position in the lower half of the figure and in an open position in the upper half of the figure.

Certain terminology is used in the following description for convenience only and is not limiting. The words "upper", "upward" and "lower", "downward" designate directions toward and away from, respectively, a designated top portion of a drill assembly. The words "inner" and "outer", "outward" refer to directions toward and away from, respectively, a designated central axis of an improved backhead or the geometric center of the drill assembly or an improved check valve, the particular meaning being readily apparent from the context of the description. The terms "radial" and "radially-extending" refer to directions generally perpendicular to the designated central axis, and refer both to elements that are either partially or completely oriented in a radial direction. The terminology includes the words specifically mentioned above, derivatives thereof, and words of similar import.

Referring now to the drawings in detail, wherein like numbers are used to indicate like elements throughout, there is shown in FIGS. 3–6 a presently preferred embodiment of a check valve system 20 for a fluid-actuated percussive drill assembly 1. The drill assembly 1 includes a casing 2 and an improved backhead 22 connected with and extending into the casing 2. The backhead 22 has a longitudinally-extending central axis 33, a supply passage 24 extending along the axis 33, and an outer surface section 26 extending circumferentially about or around the axis 33 and disposed within the casing 2. Preferably, the drill assembly 1 also includes the other components shown in FIG. 1, the details of which are beyond the scope of the present disclosure.

The check valve system 20 basically comprises one or more backhead ports 28 and an annular check valve 30 disposed about the port(s) 28. Specifically, at least one and preferably a plurality of radial ports 28 extend between the outer circumferential surface section 26 and the supply passage 24. An improved check valve 30 is disposed about the circumferential outer surface section 26 of the backhead 22 and is configured to alternately permit fluid flow through the backhead ports 28 and generally seal the backhead ports 28.

More particularly, at least a portion 30a of the check valve 30 is movable between a first position (lower half of FIG. 3), where the check valve portion 30a is disposed across and generally obstructs the backhead ports 28, and a second position (upper half of FIG. 3) where the check valve portion 30a is generally spaced from the backhead ports 28. The check valve 30 prevents fluid contained within the casing 2 from flowing into the supply passage 24 (and thus out of the drill assembly 1) when the check valve portion 30a is disposed in the first position. Further, flow communication between the supply passage 24 and one or more interior chambers 29 (only one shown) of the casing 2 is established when the check valve portion 30a is disposed in the second position. Each of the above-discussed components is described in greater detail below.

Figure 4:
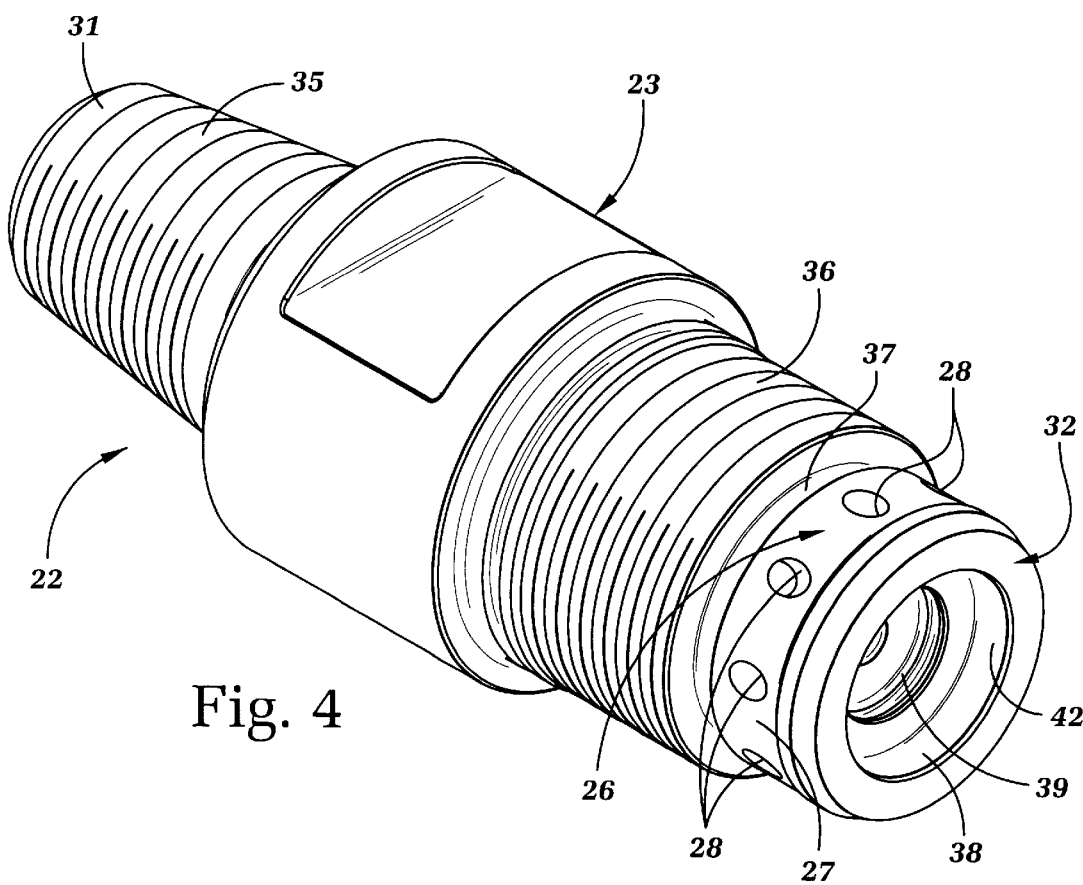
FIG. 4 is perspective view of the improved backhead.

Referring now to FIGS. 3 and 4, the improved backhead 22 is preferably constructed similarly to previously known backheads, such as the backhead 4 depicted in FIGS. 1 and 2 and discussed in the Background section hereof, but with the following primary differences. First, as mentioned above, the backhead 22 has at least one radial port 28 and preferably a plurality of radial outlet ports 28 spaced circumferentially about the outer surface section 26 of the backhead 22. Second, the backhead 22 itself is configured to generally retain the distributor 7 at a desired position within the casing 2.

In greater detail, the backhead 22 includes a body 23 having a first, upper end 31, a second, lower end 32 disposed within the casing 2, the central axis 33 extending through the body 23 and between the ends 31, 32. The first end 31, which forms a designated top portion of the drill assembly 1, extends above the casing 2 and is preferably generally identical to the upper end 4a of the known backhead 4 as depicted in FIGS. 1 and 2. The upper end 31 is adapted to be attached to the drill string of a drilling machine (neither shown), preferably by means of external threads 35 (see FIG. 3). Further, the first end 31 includes an inlet port 34 that is connectable with a supply line leading from a source of percussive fluid (e.g., a compressor) mounted on the drilling machine (none shown).

The body 23 preferably includes an externally-threaded attachment surface section 36 that is engageable with a mating internally-threaded surface section 2b of the casing 2 to thereby connect the backhead 22 with the casing 2. The outer circumferential surface section 26 of the backhead 22 is disposed between the first and second ends 31, 32, respectively, of the body 23, more specifically between the threaded attachment section 36 and the body second end 32.

Further, the portions of the outer surface section 26 to which the radial port(s) 28 do not extend form a circumferentially-extending valve seating surface 27. As discussed below, the inner circumferential surface of the check valve 30 seats against the seating surface 27 when the valve 30 is disposed in the "closed" position. Furthermore, the backhead body 23 preferably includes an annular recess 37 extending circumferentially into the body 23 from the outer surface of the body 23 and is disposed adjacent to the outer circumferential surface section 26, the purpose of which is described below.

Still referring to FIGS. 3 and 4, the backhead 22 preferably includes several radial outlet ports 28 spaced circumferentially about the outer circumferential surface section 26, as best shown in FIG. 4. Alternatively, the backhead 22 may have only a few ports 28 or even, although not preferred, only one port 28 as a single port 28 is capable of operating the drill assembly 1. Referring particularly to FIG. 3, each port 28 extends radially between the outer circumferential surface section 26 and the supply passage 24 (described in further detail below). Preferably, the ports 28 are each angled upwardly toward the supply passage 24 so as to extend partially in an axial direction (i.e., along the axis 33). Each port 28 may alternatively extend substantially radially between the outer surface 26 and the passage 24, and thus generally in a direction perpendicular to the backhead central axis 33 or, although not preferred, may even angle downwardly toward the passage 24 (i.e., toward the body second end 32).

Referring particularly to FIG. 3, the supply passage 24 extends through the body 23 between the inlet port 34 and the outlet ports 28 and generally along the central axis 33. The supply passage 24 may either be substantially centered on the axis 33 (as shown) or extend generally parallel with the axis 33 (not shown). Preferably, the supply passage 24 is formed as a "blind" circular bore extending from the inlet port 34 to an internal bottom portion 24a and has a generally constant inner diameter. However, the supply passage 24 may alternatively be formed in any other appropriate manner, such as with a tapering or stepped longitudinal (i.e., axial) cross-section or as a plugged "through" bore (none shown), as long as the check valve system 20 is capable of functioning as described above and below. Further, the body 23 may alternatively include two or more supply passages 24 extending along the axis 33, each being generally parallel with the axis 33 and with each other.

Referring again to FIGS. 3 and 4, the lower or inner end 32 of the body 23 is configured to receive a portion 7a of the fluid distributor 7 of the drill assembly 1 so as to generally retain the distributor 7 at a desired position within the casing 2. Preferably, a generally cylindrical recess 38 extends axially (i.e., along axis 33) into the body 23 from the second end 32 and is sized to receive the generally cylindrical distributor portion 7a. Preferably, as the drill assembly 1 ideally includes a distributor valve 10 as discussed in the Background section above, the recess 38 is configured to also fit about the valve 10 and to provide a bearing surface to guide the movement of the valve 10 along the cylindrical distributor portion 7a, as discussed below.

Preferably, the recess 38 is at least partially defined by a first inner circumferential surface section 39 in the body 23 that is generally centered about the central axis 33. The first inner surface section 39 preferably has an inside diameter that is slightly greater than the outside diameter of the cylindrical portion 7a (neither diameter indicated in the figures) such that recess surface 39 fits tightly about the cylindrical distributor portion 7a. Most preferably, a cylindrical gasket 40 (FIG. 3) is disposed within a circumferentially-extending annular recess 41 in the inner surface 39. By having a gasket 40 in the recess 38, the distributor portion 7a is retained in the recess 38 by friction between the inner surface of the gasket 40 and the outer surface of the distributor portion 7a, thereby retaining the distributor 7 at a desired position.

Alternatively, the recess 38 may be formed such that there is a friction or interference fit between the circumferential surface 39 and the outer surface of the distributor portion 7a. Further, any other method for retaining the distributor portion 7a in the recess 38 may be used, such as for example, by threaded fasteners, interlocking components, or although not preferred, by welding, adhesives or another such means for permanent or semi-permanent attachment. As an even further alternative, the second end 32 of the backhead 22 may be configured to include a suitable projection configured to mate with a recess (neither shown) at the free end of the distributor portion 7a, such that the distributor 7 is retained at the desired position within the casing 2. The present invention embraces these and all other configurations of the inner or second, lower end 32 of the backhead 22 that are capable of retaining the distributor 7 at a desired position within the casing 2.

When configured for use with a drill assembly 1 having a distributor valve 10, the backhead recess 38 is preferably formed to include a second inner circumferential surface section 42. The second inner surface section 42 is preferably generally centered about the axis 33 and positioned offset radially outwardly from, and spaced axially more proximal to the backhead end 32 than, the first surface section 39, as best shown in FIG. 4. With the second surface section 42, the backhead recess 38 generally resembles a "counter-bored" hole. The second inner surface section 42 provides a bearing surface for guiding the movement of the distributor valve 10 along the outer surface of the distributor portion 7a. However, when the improved backhead 22 is used with a drill assembly 1 that does not include the distributor valve 10, the recess 38 is formed without the second inner surface 42. In that case, the first inner surface section 39 would extend from the end 32 of the backhead 22 to the inner end of the recess 38 (configuration not shown).

Figure 5:
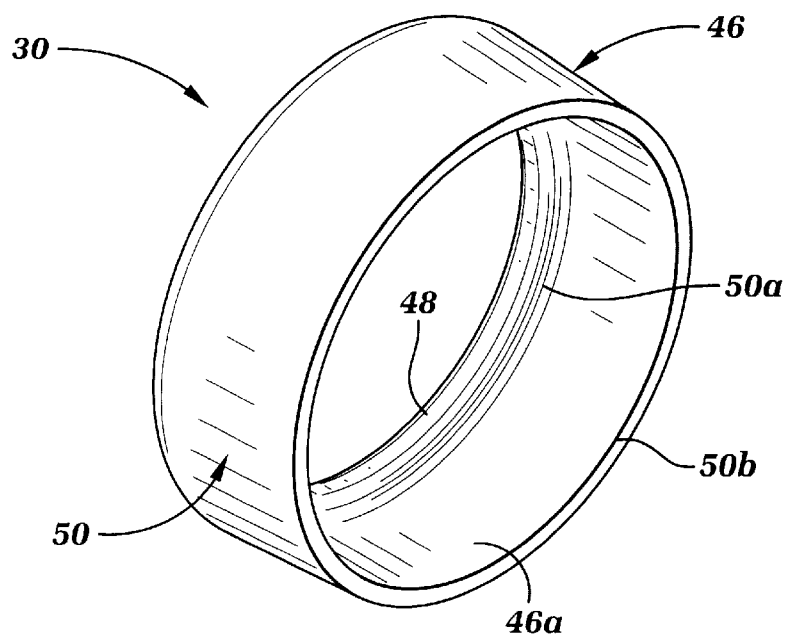
FIG. 5 is an enlarged perspective view of the improved check valve.
Figure 6:
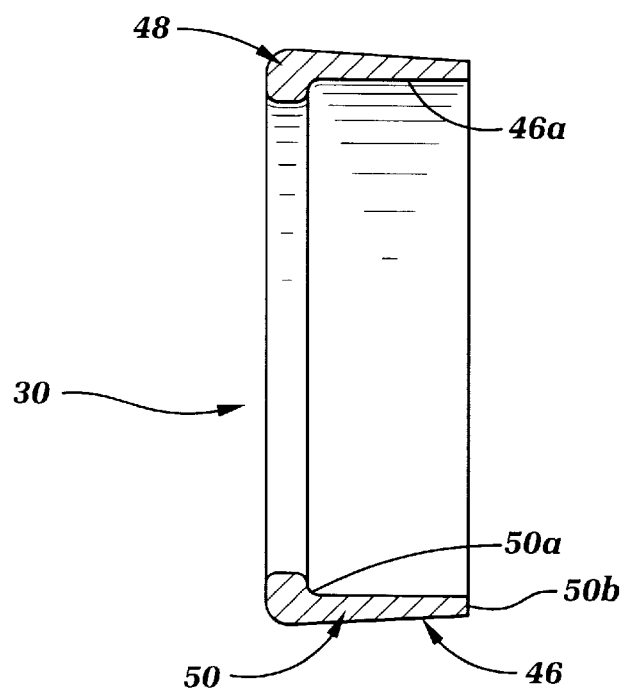
FIG. 6 is an axial cross-sectional view of the check valve shown in FIG. 5.

Referring now to FIGS. 3 and 5–6, the improved check valve 30 is preferably formed as an integral, generally annular member 46. The annular member 46 is sized and shaped to fit over and extend completely about or around the outer circumferential surface 26 of the backhead 22, such that, when the valve 30 is assembled onto the backhead 22, an inner circumferential surface 46a of the member 46 is disposed against the valve seating surface 27. Alternatively, the check valve 30 may be formed as a partial annular or arcuate member having two ends (not shown) retained to the backhead 22 by appropriate means, particularly if the outer circumferential surface 26 does not extend completely about or around the axis 33. As a further alternative, the check valve 30 may be formed of two or more members or member portions assembled together (not shown) so as to function generally as described herein.

Preferably, the annular member 46 is constructed as a circular ring portion 48 integrally formed with a tubular portion 50. The ring portion 48 is sized to be fitted about the backhead outer surface proximal to the backhead ports 28, and most preferably, to be disposed within the annular recess 37. The ring portion 48 is thus configured to retain the valve 30 mounted onto the backhead 22. The tubular portion 50 has a first end 50a integrally attached to the ring portion 48 and a second, free end 50b. When the annular member 46 is mounted onto the backhead 22, the first and second ends 50*a*, 50*b* of the tubular portion are disposed on opposing sides (i.e., upper and lower sides) of each of the backhead ports 28, such that the tubular portion 50 extends completely across each of the ports 28.

Further, the tubular portion 50 is deflectable or rotatable about the ring portion 48 such that tubular portion 50 moves alternately toward and away from the backhead ports 28. Thus, the tubular portion 50 provides the movable portion 30*a* of the check valve 30 as discussed above. As discussed above and described in further detail below, sufficient fluid pressure in the supply passage 24 causes the entire tubular portion 50 to deflect or rotate to the second position spaced from the backhead ports 28, as depicted in the upper half of FIG. 3. Preferably, the tubular portion 50 rotates or deflects about the ring portion 48 in a manner generally similar to a bending cantilever, as shown in FIG. 3 (upper half). When the fluid pressure decreases below a certain amount, elastic forces in the material of the annular member 46 cause the tubular portion 50 to deflect from the second position back to the first position (lower half of FIG. 3).

Although the above-described structure of the annular member 46 is preferred, it is within the scope of the present invention to construct the annular member 46 in any appropriate manner that enables the check valve 30 to both displace from the circumferential valve seat 27 to allow percussive fluid to flow through the port(s) 28 (and into the casing 2) and to seal the backhead port(s) 28 when the source of percussive fluid is turned off. For example, the annular member 46 may be formed as a completely tubular section or a circular band (i.e., without the ring portion)(not shown), so as to have the general appearance of a common "rubber band". With such a structure, pressure of percussive fluid in the supply passage 24 causes the portions of the tube/band that extend over the ports 28 to displace radially-outwardly, either by bending in an axial direction or by "bulging" or displacing radially outwardly without axial displacement. When the percussive fluid is flowing through the ports 28, the portions of the tube/band between the displaced portions may either remain in contact with the valve seating surface 27, or the whole tube/band may move or "expand" radially-outwardly so that the band/tube is displaced completely out of contact with the backhead 22.

The above-described structure is only one example of an alternative construction of the annular member 46, and this configuration and all other alternative structures that enable the check valve 30 to function essentially as described herein are embraced within the scope of the present invention.

With the preferred construction of the annular member 46 described above, the check valve system 20 functions generally as follows. When percussive fluid is not flowing into the drill assembly 1 through the backhead inlet port 34, the check valve 30 is arranged with the tubular portion 50 located in the first or "closed" position, as shown in the lower half of FIG. 3. In the closed position, the tubular portion 50 is disposed against the valve seating surface 27 so as to extend over and obstruct all of the ports 28. The ports 28 are thereby substantially sealed, such that percussive fluid is prevented from flowing out of the casing 2 through the backhead supply passage 24. In the first or closed position, the tubular portion 50 has a generally cylindrical shape.

When percussive fluid flows into the backhead inlet port 34 and through the supply passage 24, the pressure of the fluid causes the tubular portion 50 to deflect so as to rotate radially-outwardly about the ring portion 48. The tubular portion 50 thus displaces from the valve seating surface 27 and away from the ports 28 to a second or "open" position (upper half of FIG. 3). Thereafter, the pressure of percussive fluid maintains the tubular portion 50 in the second position, i.e., spaced from the ports 28, as the fluid flows into the interior chamber 29 and to other interior portions of the casing 2. The percussive fluid thereafter circulates through the drill assembly 1 to operate the piston 3 and thereby the drill bit 6. When disposed in the second position, the deflected tubular portion 50 has a slightly conical shape, as generally depicted in the upper half of FIG. 3.

When the source of percussive fluid is then shut off so that the fluid ceases flowing into the backhead supply passage 24, material forces arising in the check valve 30 due to the deflection or "bending" of the tubular portion 50 cause the tubular portion 50 to displace back to the first, closed position. The tubular portion 50 then seats against the valve seating surface 27 so as to again be disposed across the ports 28. The ports 28 are thus sealed and the fluid pressure within the casing 2 is maintained above ambient pressure to prevent contaminants from backflowing into the drill assembly 1.

Preferably, the improved backhead 22 is constructed of alloy steel that is cast, finished by appropriate machining operations and heat treated. Further, the improved check valve 30 is preferably constructed of an elastomeric material, and most preferably natural or synthetic rubber, that is molded in an appropriate molding operation. However, it is within the scope of the present invention to construct the backhead 22 or valve 30 in any other appropriate material or any other appropriate manufacturing technique, such as for example, forming the backhead 22 of low carbon steel.

The check valve system 20 of the present invention has a number of advantages over previously known check valve systems, such as the one depicted in FIGS. 1 and 2. The valve system 20 has a simplified construction with only one moving part, the annular valve 30, so that it is generally easier and less expensive to manufacture. Further, the system 20 is less likely to wear or fail as the deflecting or bending of the check valve 30 is the only movement occurring in the operation of the system 20. Further, if the preferred elastomeric material of the check valve 30 should become "work hardened" such that the valve 30 needs to be replaced, the backhead 22 is simply un-threaded from the casing 2, and then the valve 30 is easily removed and a new valve 30 fitted onto the backhead 22. Further, the improved backhead 22 enables the elimination of the valve cap 14, the retainer 16 and the spring 17, such that the drill assembly 1 is thereby simpler and less expensive to produce.

It will be appreciated by those skilled in the art that changes could be made to the embodiments described above without departing from the broad inventive concept thereof. For example, the present invention is depicted and described with reference to a down-hole drill, the check valve system 20 and improved backhead 22 of the present invention are equally applicable to an "out-of-hole" fluid-actuated percussive drill assembly (i.e., with a drill assembly that does not operate primarily subterraneously), such applications being embraced within the scope of the present invention. It is understood, therefore, that this invention is not limited to the particular embodiments disclosed, but it is intended to cover modifications within the spirit and scope of the present invention as defined by the appended claims.

Having described the invention, what is claimed is:

1. A check valve system for a fluid-actuated percussive drill assembly including a casing and a backhead connected with and extending into the casing, the backhead having a longitudinal central axis, a supply passage extending along the axis, and an outer surface section extending circumferentially about the axis and disposed within the casing, the system comprising:

a port extending between the outer circumferential surface section of the backhead and the supply passage; and a check valve disposed about the outer circumferential surface section of the backhead and configured to alternately permit fluid flow through the backhead port and substantially seal the backhead port.

2. The check valve system as recited in claim 1 wherein at least a portion of the check valve is movable between a first position where the check valve portion is disposed across and generally obstructs the backhead port and a second position where the check valve portion is spaced from the backhead port.

3. The check valve system as recited in claim 2 wherein the check valve prevents percussive fluid disposed within the casing from flowing into the supply passage when the check valve portion is disposed in the first position.

4. The check valve system as recited in claim 2 wherein the casing has at least one interior chamber and flow communication between the supply passage and the interior chamber is established when the check valve portion is disposed in the second position.

5. The check valve system as recited in claim 1 wherein the backhead has a plurality of ports spaced circumferentially about the outer surface section, each port extending between the outer surface section and the supply passage, and the check valve is simultaneously disposed about all of the backhead ports.

6. The check valve system as recited in claim 1 wherein the drill assembly includes a fluid distributor disposed within the casing and the backhead is configured to retain the distributor generally at a desired position within the casing.

7. The check valve system as recited in claim 6 wherein the backhead has an inner end disposed within the casing and a recess extending into the backhead from the inner end and generally along the central axis, the recess being configured to receive and retain a portion of the distributor.

8. The check valve system as recited in claim 7 wherein:

the distributor portion is generally cylindrical;

the drill assembly further includes a distributor valve disposed about and slidable upon the distributor portion; and the recess is defined by:

a first inner circumferential surface section generally centered about the longitudinal axis, the distributor portion being retained by the first surface section; and a second inner circumferential surface section generally centered about the axis, the second section being offset radially-outwardly with respect to the first surface section and disposed more proximal to the backhead inner end than the first surface section, the second surface section providing a bearing surface for guiding movement of the distributor valve with respect to the distributor portion.

9. The check valve system as recited in claim 1 wherein the check valve is formed as an integral annular member.

10. The check valve system as recited in claim 9 wherein the check valve includes:

a circular ring portion disposable against the backhead outer surface proximal to the backhead port so as to retain the annular member mounted on the backhead; and a tubular portion having a first end attached to the ring portion and a second, free end, the first and second ends being disposed on opposing sides of the backhead port when valve is mounted on the backhead, the tubular portion being deflectable about the ring portion such that the tubular portion is movable alternately toward and away from the backhead port.

11. A check valve for a fluid-actuated percussive drill assembly including a casing and a backhead connected with and extending into the casing, the backhead having a longitudinal central axis, a supply passage extending along the axis, an outer surface extending circumferentially about the axis and disposed within the casing, and a port extending between the outer circumferential surface and the supply passage, the check valve comprising:

an annular member disposable about the outer circumferential surface of the backhead and configured to alternately permit fluid flow through the backhead port and substantially seal the backhead port.

12. The check valve as recited in claim 11 wherein at least a portion of the annular member is movable between a first position where the member portion is disposed across and generally obstructs the backhead port and a second position where the member portion is spaced from the backhead port.

13. The check valve as recited in claim 12 wherein:

the annular member portion is movable from the first position to the second position by pressure of percussive fluid in the backhead; and the annular member portion is movable from the second position to the first position by material forces in the annular member.

14. The check valve as recited in claim 11 wherein the backhead has a plurality of ports spaced circumferentially about the backhead outer surface and the annular member is simultaneously disposed about all of the backhead ports.

15. The check valve as recited in claim 11 wherein the annular member is formed of an elastomeric material.

16. The check valve as recited in claim 11 wherein the annular member includes:

a circular ring portion disposable against the backhead outer surface proximal to the backhead port so as to retain the annular member mounted on the backhead; and a tubular portion having a first end attached to the ring portion and a second, free end, the first and second ends being disposed on opposing sides of the backhead port when valve is mounted on the backhead, the tubular portion being deflectable about the ring portion such that tubular portion is movable alternately toward and away from the backhead port.

* * * * *